United States Patent
Nicholes et al.

(10) Patent No.: US 10,784,959 B2
(45) Date of Patent: Sep. 22, 2020

(54) SYSTEM AND METHOD FOR IDENTIFYING AND TRACKING A MOBILE LASER BEACON IN A FREE SPACE OPTICAL SYSTEM

(71) Applicant: The Johns Hopkins University, Baltimore, MD (US)

(72) Inventors: David D. Nicholes, Edgewater, MD (US); Radha A. Venkat, Columbia, MD (US)

(73) Assignee: The Johns Hopkins University, Baltimore, MD (US)

( * ) Notice: Subject to any disclaimer, the term of this patent is extended or adjusted under 35 U.S.C. 154(b) by 0 days.

(21) Appl. No.: 16/558,059

(22) Filed: Aug. 31, 2019

(65) Prior Publication Data

US 2020/0099448 A1    Mar. 26, 2020

Related U.S. Application Data

(60) Provisional application No. 62/736,539, filed on Sep. 26, 2018.

(51) Int. Cl.
*H04B 10/112* (2013.01)
*G06T 7/254* (2017.01)

(52) U.S. Cl.
CPC .......... *H04B 10/1121* (2013.01); *G06T 7/254* (2017.01); *G06T 2207/10016* (2013.01); *G06T 2207/20224* (2013.01)

(58) Field of Classification Search
CPC ........................... H04B 10/114; H04B 10/112
See application file for complete search history.

(56) References Cited

U.S. PATENT DOCUMENTS

2016/0134367 A1*  5/2016  Bitauld ............ H04B 10/07955
                                                                   398/38

* cited by examiner

*Primary Examiner* — Shi K Li
(74) *Attorney, Agent, or Firm* — Noah J. Hayward (57) ABSTRACT

A method supported by a first terminal is provided herein. To implement the method, a camera of a first terminal performs two or more captures of two or more frames along a line of sight toward a second terminal. A controller of the first terminal manipulates the two or more frames to produce two or more interim images and analyzes the two or more interim images to track a beacon of the second terminal. The controller outputs coordinates with respect to the tracked beacon to a mirror package of the first terminal.

17 Claims, 8 Drawing Sheets

SYSTEM AND METHOD FOR IDENTIFYING AND TRACKING A MOBILE LASER BEACON IN A FREE SPACE OPTICAL SYSTEM

CROSS REFERENCE TO RELATED APPLICATIONS

This application claims priority to and claims the benefit of U.S. Provisional Application No. 62/736,539 filed on Sep. 26, 2018, the entire disclosure of which is incorporated herein by reference.

BACKGROUND

The disclosure relates generally to a video tracking system and method or algorithm for free-space optical (FSO) communications, and more particularly, to a video processing system for identifying and tracking a mobile laser beacon in an FSO system.

Conventionally, two FSO terminals establish and utilize a data link to send and receive optical signals. Thus, the two FSO terminals include and utilize some sort of beam steering element to actively point, send, and receive, therebetween, the optical signals. In closed loop tracking, portions of those optical signals are used for position information to achieve an optical alignment for the data link. Yet, due to a high directionality of the data link, very high precision beam steering is required.

For example, in a first FSO terminal, an optical modem generates and provides an outgoing optical signal to an optical fiber of the first FSO terminal. The optical fiber directs the outgoing optical signal to a beam steering element of the first FSO terminal, which projects the outgoing optical signal as a beam to a second FSO terminal. The second FSO terminal receives the beam, as an incoming optical signal, through its aperture. A beam steering element of the second FSO terminal then directs a portion of the beam (e.g., via a passive beam splitter) to a position sensing detector therein. The position sensing detector provides position information to a controller of the second FSO terminal that adjusts the beam steering element as needed to achieve an optical alignment between the first and second FSO terminals. Note that, at the same time, the second FSO terminal is also sending an outgoing optical signal that is received and processed by the first FSO terminal in a similar manner.

Optical alignment between the two FSO devices is a key consideration that introduces significant complexity and cost to the design of these FSO terminals. In particular, any drift in a relative optical axis between the optical fibers and the position sensing detectors can result in highly degraded acquisition and tracking of the optical signals. Further, any significant misalignment of the optical alignment before an initial acquisition could prevent ever acquiring the data link between the two FSO terminals.

Additionally, the position sensing detectors include at least three individual detectors and a common cathode. The common cathode is shared by and, in turn, sets a noise floor for the at least three individual detectors. Thus, the common cathode limits the noise floor to higher levels, which furthers limits the acquisition and tracking link margin for the FSO terminals.

BRIEF DESCRIPTION

According to one or more embodiments, a method supported by a first terminal is provided herein. To implement the method, a camera of a first terminal performs two or more captures of two or more frames across/along a line of sight toward a second terminal. A controller of the first terminal manipulates the two or more frames to produce two or more interim images and analyzes the two or more interim images to track a beacon of the second terminal. The controller outputs coordinates with respect to the tracked beacon to a mirror package of the first terminal.

According to one or more embodiments or the method embodiment above, the two or more captures can be synchronous with a flashing, by a beacon device of the second terminal, of the beacon, such that the beacon is on for a last frame of the two or more frames and off for a current frame of the two or more frames.

According to one or more embodiments or any of the method embodiments above, the manipulation of the two or more frames can include executing an image registration to process a last frame of the two or more frames to a current frame of the two or more frames.

According to one or more embodiments or any of the method embodiments above, the manipulating of the two or more frames can include executing a frame subtraction to calculate a difference between pixels of the two or more frames. The manipulating of the two or more frames can include generating a differenced image based on the calculated difference.

According to one or more embodiments or any of the method embodiments above, the manipulating of the two or more frames can include executing a thresholding to set pixels with values below a predefined level to zero. The pixels can be defined by a differenced image generated from the two or more frames.

According to one or more embodiments or any of the method embodiments above, the manipulating of the two or more frames can include executing an accumulation to reduce effects of transient bright spots for isolated pixels of a differenced image generated from the two or more frames.

According to one or more embodiments or any of the method embodiments above, the manipulating of the two or more frames can include a morphological operation to create a uniform blob out of remaining bright objects in a differenced image generated from the two or more frames to produce at least one of the two or more interim images.

According to one or more embodiments or any of the method embodiments above, the analyzing the two or more interim images can include identifying a brightest pixel in each of the two or more interim images.

According to one or more embodiments or any of the method embodiments above, the analyzing of the two or more interim images can include identifying pixel groups based on characteristics in each of the two or more interim images.

According to one or more embodiments, the above method can be implemented as a system, a device, an apparatus, and/or a computer program product.

Additional features and advantages are realized through the techniques of the present disclosure. Other embodiments and aspects of the disclosure are described in detail herein. For a better understanding of the disclosure with the advantages and the features, refer to the description and to the drawings.

BRIEF DESCRIPTION OF THE DRAWINGS

The subject matter is particularly pointed out and distinctly claimed in the claims at the conclusion of the specification. The forgoing and other features, and advantages of the embodiments herein are apparent from the following detailed description taken in conjunction with the accompanying drawings in which:

DETAILED DESCRIPTION

A video tracking system, algorithm, and method for free-space optical (FSO) communications is provided herein. More particularly, an FSO system performs alignment operations by using a beacon and a camera in each FSO terminal of the FSO system, along with a video processing method and algorithm for identifying and tracking the beacons.

Figure 1:
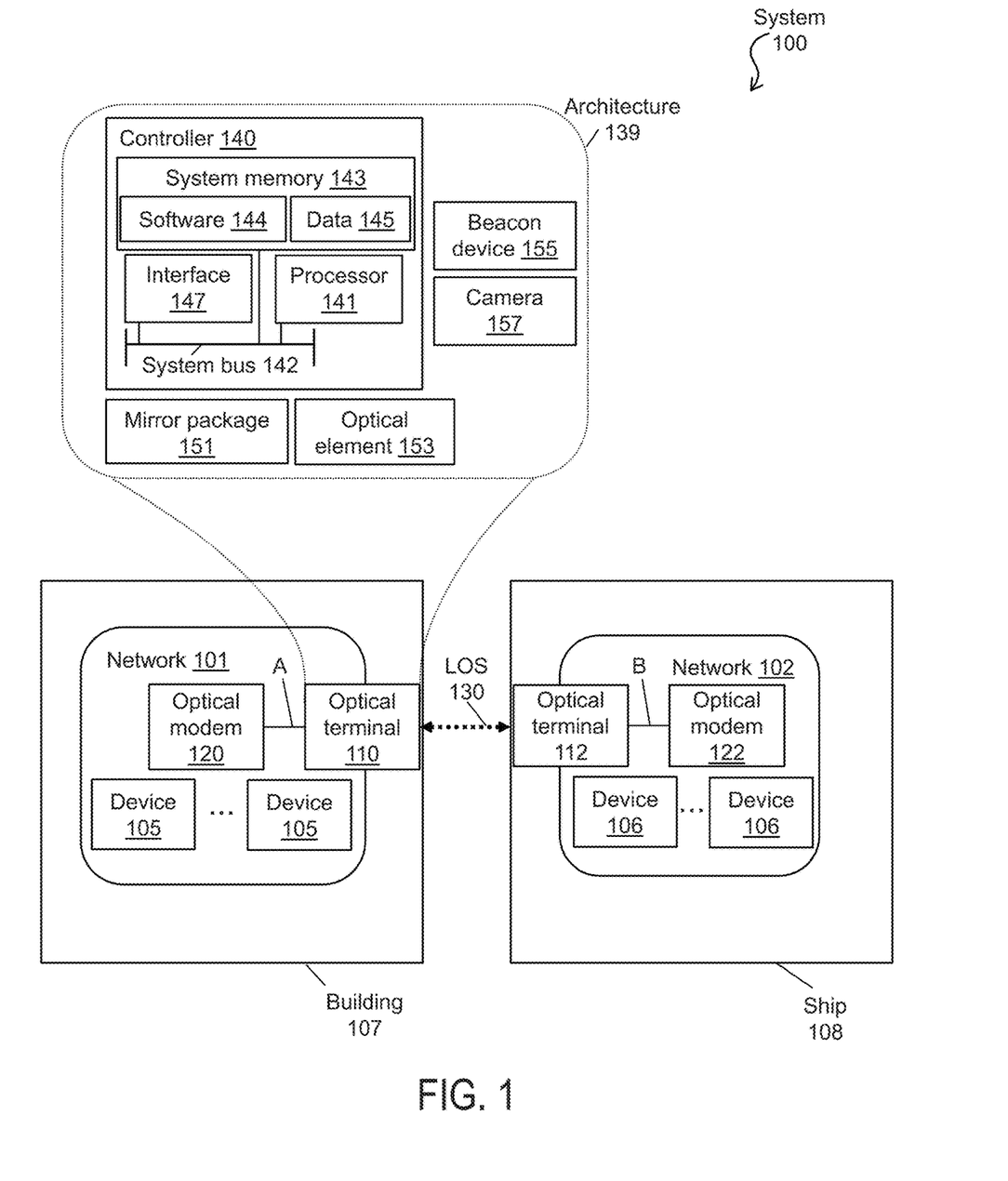
FIG. 1 depicts a system including two optical terminals connecting two networks according to one or more embodiments.

Turning now to FIG. 1, a system 100 (e.g., an FSO system) is depicted according to one or more embodiments. The system 100 can include at least two networks 101 and 102 (e.g., a first network 101 and a second network 102), each with a plurality of devices 105 and 106, respectively, therein.

The networks 101 and 102 can be any type of network, for example, a local area network, a wide area network, a wireless network, and/or the Internet, including copper transmission cables, optical transmission fibers, wireless transmissions, routers, firewalls, switches, gateway computers, edge servers, encryptors, and/or the like. The devices 105 and 106 can be any electronic or computing devices and components, such as desktops, laptops, servers, tablets, phones, digital assistants, e-readers, and the like.

The networks 101 and 102 reside with respect to stationary locations and/or mobile objects, such as a ship, a ground vehicle, an aircraft, a satellite, a building, a spaceship, a tower, a light house, a buoy, and the like, where a cost of running physical cables there between is prohibitive and/or impractical. As shown in FIG. 1, the networks 101 and 102 be located in or on a building 107 and a ship 108.

The networks 101 and 102 support communications respectively between the devices 105 and 106. Further, the networks 101 and 102 are connected by at least two terminals 110 and 112, e.g., a first terminal 110 and a second terminal 112 (which, in an example embodiment, may be first and second optical terminals 110 and 112) and corresponding optical modems 120 and 122. In this way, the networks 101 and 102 may be in any location so long as a line of sight (LOS) 130 is present between the two optical terminals 110 and 112. In turn, the two optical terminals 110 and 112 can establish an FSO data link, over-the-air across/along the LOS 130 (e.g., in a free-space between the two optical terminals 110 and 112), so that at least one device 105 of the network 101 can communicate with at least one device 106 of the network 102, and vice versa.

The optical terminals 110 and 112 can be any computer framework including and/or employing any number and combination of computing devices and components utilizing various communication technologies, as described herein. The optical terminals 110 and 112 can be easily scalable, extensible, and modular, with the ability to change to different services or reconfigure some features independently of others. The optical terminals 110 and 112 interface with the optical modems 120 and 122 via optical fibers A and B that capture incoming signals and transmit/send outgoing signals into the free-space between the building 107 and the ship 108 (e.g., over-the-air across/along the LOS 130). The optical fibers A and B and the optical modems 120 and 122 can utilize single-mode communications for higher data rates, e.g., greater than 10 Gigabits per second (Gbps) or multimode communications for lower data rates (e.g., less than 1 Gbps), as the optical terminals 110 and 112 permit universal interfacing with hardware and configurations. Note that the optical terminals 110 and 112 leverage a reciprocity of the incoming/outgoing signals, in that the optical terminals 110 and 112 transmit/send the outgoing signal out of a same aperture as the incoming signal is received and adjust a pointing of the outgoing signal based on an angle of the incoming signal.

As shown in FIG. 1, in accordance with one or more embodiments, the optical terminals 110 and 112 can each be configured as an architecture 139 including a controller 140.

The controller 140 may contain any electronic circuitry (e.g., field-programmable gate arrays (FPGA) or programmable logic arrays (PLA)) that may execute computer readable program instructions (e.g., a computer program product) by utilizing state information therein to personalize the electronic circuitry. In accordance with one or more embodiments and as shown in FIG. 1, the controller 140 has a processor 141, which can include one or more central processing units (CPUs), and be referred to as a processing circuit, microprocessor, and/or computing unit. The processor 141 is coupled via a system bus 142 to a system memory 143 and various other components.

The system memory 143, which is an example of a tangible storage medium readable executable by the processor 141, can include read only memory (ROM) and random access memory (RAM). The system memory 143 stores software 144 and data 145. The software 144 (e.g., a computer program product) is stored as instructions for execution on the controller 140 by the processor 141 (to perform processes, such as the process flows 200, 300, and 400 of FIGS. 2-4). The data 145 includes a set of values of qualitative or quantitative variables organized in various data structures to support and be used by operations of the software 144. The controller 140 includes one or more interfaces 147 (e.g., one or more adapters, controller, network, or graphics adapters) that interconnect and support communications between the processor 141, the system memory 143, and other components of the architecture 139 (e.g., peripheral and external devices). Thus, as configured in FIG. 1 the operations of the software 144 and the data 145 (e.g., the controller 140) are necessarily rooted in the computational ability of the processor 141 and to overcome and address the herein-described shortcomings of the conventional FSO terminals. In this regard, the software 144 and the data 145 improve computational operations of the processor 141 and/or the controller 140 by identifying a location of a link partner's terminal (e.g., optical terminal 112 in FIG. 1).

The architecture 139 also includes a mirror package 151 and an optical element 153. The mirror package 151 includes at least one or more actuators, mounts, and steering mirrors. The actuator(s) can be any electric device that converts electrical energy into mechanical torque by using the electrical energy to articulate the steering mirror(s) based on control signals. The mount(s) can be any dynamic two-axis mount that permits movement by the actuator of angles of the steering mirror. The steering mirror(s) can be any reflective surface fixed to the mount that directs the incoming/outgoing signals to the optical element 153 or out of the terminal 110.

The optical element 153 can be any mechanism for accepting or outputting incoming/outgoing signals to the terminal 110. The optical element 153 can include, but is not limited to, optical fibers, position sensing detector elements, mirrors, and lenses, or combination thereof.

Further, the architecture 139 includes a beacon device 155 and a camera 157, which together can be referred to as a video tracking system for implementing methods according to one or more example embodiments. The beacon device 155 can be any component or circuitry that outputs a mobile laser beacon, a cooperative laser beacon, an optical beam, or a beacon. The beacon can be an emission of light through optical amplification via a stimulated emission of electromagnetic radiation, sometimes referred to as a laser beam or laser. The beacon device 155 can transmit/flash/pulse the beacon at a predetermined wavelength and at predetermined intervals (e.g., one frame per second, 10 frames per second, and/or 100 frames per second) and a predetermined duty cycle (e.g., on for 50% of the time, on for 10% of the time). The data 145 of the system memory 143 can specify the predetermined wavelength, duty cycles, and intervals. For instance, the beacon device 155 (and/or the optical terminal 110 itself) can utilize a global positioning system (GPS) 1 pulse per second (PPS) module that provides a digital output signal that changes value on a 1 second boundary for coordinated universal time (UTC). A cross-section of the beacon itself can take the form of any shape. In accordance with one or more embodiments, the cross-section of the beacon is a circle. The data 145 of the system memory 143 can specify the beacon shape.

The camera 157 can be any device that records visual images or frames as photographs or video, such as a shortwave infrared camera. In this regard, the camera 157 captures, performs a capture of, or receives at least two frames, one of which includes a beacon outputted by the beacon device 155 of a link partner's terminal (e.g., of the terminal 112 in FIG. 1). In accordance with one or more embodiments, the camera 157 utilize the GPS 1 PPS module (e.g., of the terminal 110) to captures frames at intervals consistent with the pulsing of the beacon. Thus, the camera 157 is employed to programmatically identify and track the beacon transmitted by the link partner. Optionally, the camera can include one or more filters that isolate the predetermined wavelength of the beacon. Note that with the one or more filters in place, the beacon is generally the brightest object in the frames. Further, a gain and an exposure of the camera 157 can be set so objects visible to the naked eye are visible on the camera 157. In turn, the beacon is generally saturating a portion of a sensor of the camera 157 that it is hitting, which, for example artificially reduces an available signal to noise ratio of the beacon.

The video tracking system and accompanying method/algorithm provides for an ability to identify and track the beacon (e.g., by increasing a signal to noise ratio of the beacon to isolate the beacon), to calculate relative pointing offsets to a pointing mechanisms (e.g., such as the beam steering element) with precision on the order of approximately 10 to 100 micro radians, and to reject unwanted clutter and false beacons through a variety of optimization parameters based on size, shape, intensity, and persistence characteristics.

Figure 2A:
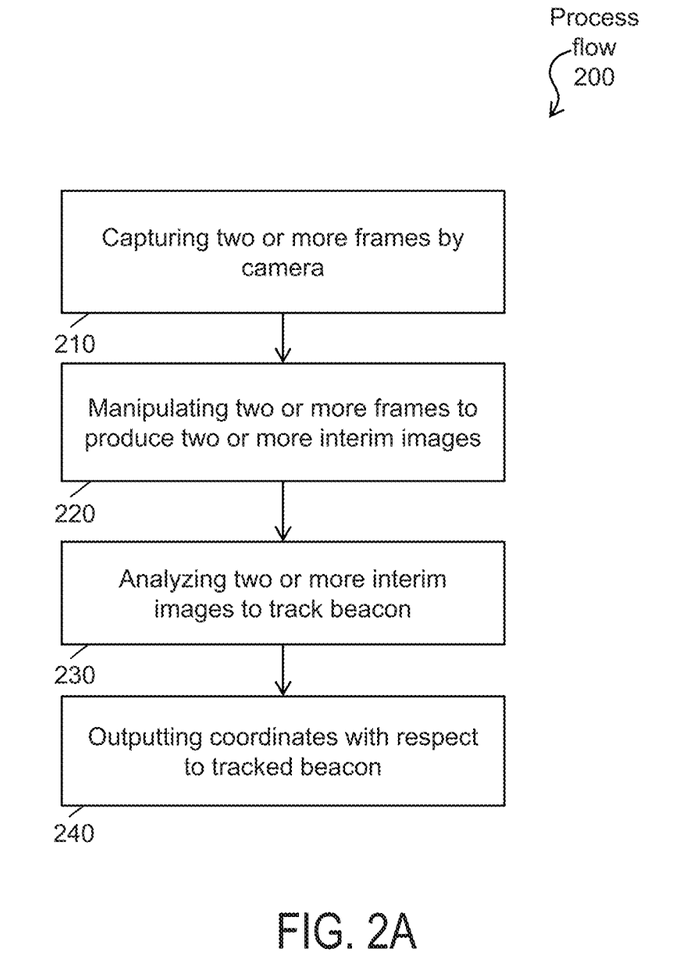
FIG. 2A depicts a process flow according to one or more embodiments.

Turning now to FIG. 2A, a process flow 200 is depicted according to one or more embodiments. The process flow 200 is an example operation of the system 100 of FIG. 1 and is thus described with respect to the architecture 139 of FIG. 1.

Figure 2B:
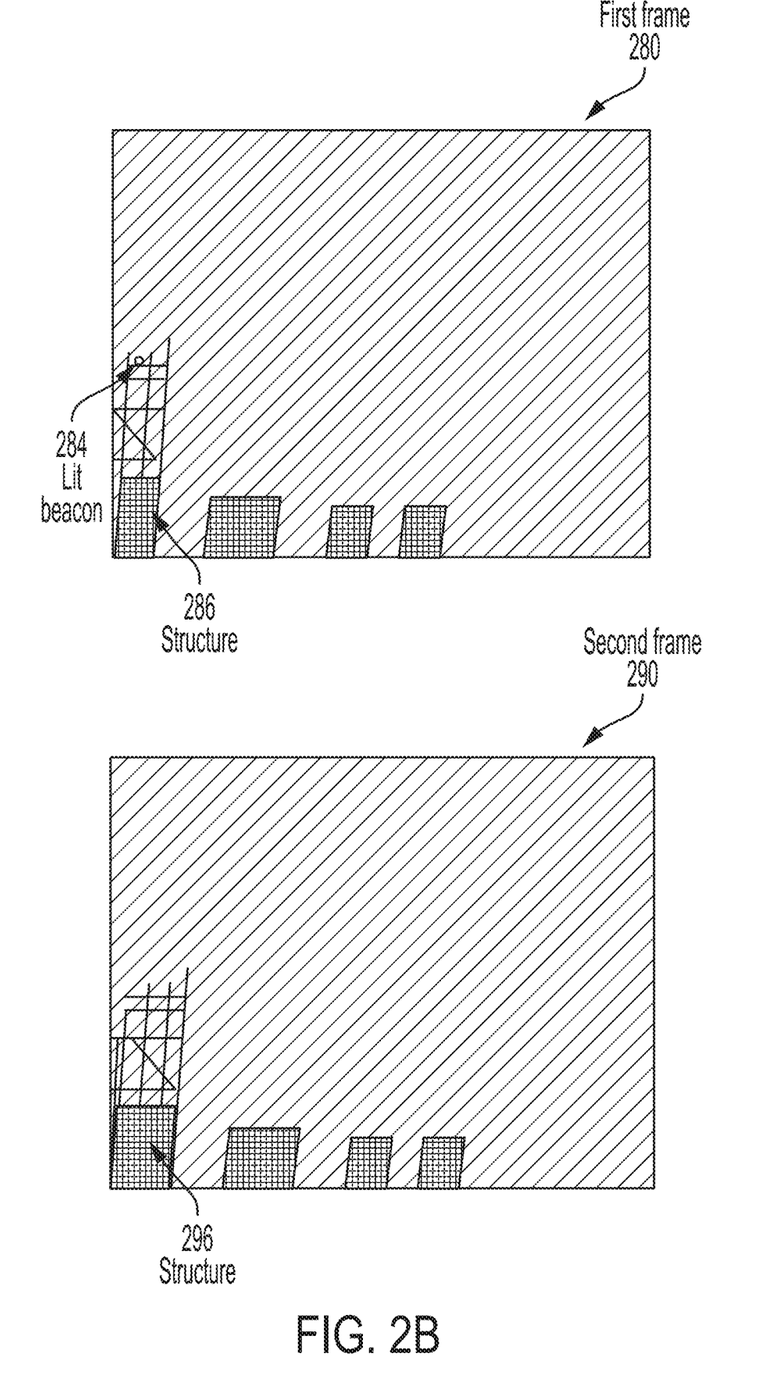
FIG. 2B depicts captured frames according to one or more embodiments.

The process flow 200 begins at block 210, where two or more frames are received/captured by the camera 157. FIG. 2B illustrates a first frame 280 including a lit beacon 284 on a structure 286 (e.g., a derrick of a ship) and a second frame 290 including a structure 296 (e.g., the same derrick of the same ship) without the lit beacon 284. Note that the structure 296 in the second frame 290 is in a slightly different position than the structure 286 in the first image 280. In this regard, the camera 157 of the terminal 110 images (e.g., performs a capture) across/along the LOS 130 toward the terminal 112. When the capturing of the two or more frames is initialized, the frame capture can be a coarse or wide action so that the beacon device 155 of the terminal 112 is flashing within each image capture. Each image capture of the two or more frames is synchronous with flashing/pulsing by the beacon device 155 of the terminal 112, such that the beacon is on for one image (e.g., the first frame 280 including the lit beacon 284) and off for another (e.g., the second frame 290 without the lit beacon 284). In accordance with one or more embodiments, the beacon can be modulated and the camera 157 is triggered on the same signal using a GPS 1 PPS signal (e.g., the beacon device 155 is triggered at 15 pulses per second and the camera 157 is triggered at 30 frames per second). Note that a signal to noise ratio of the beacon can be increased by transmitting/sending the beacon at a predetermined wavelength and incorporating filters into the camera 157. Furthermore, the gain and exposure of the camera 157 can be reduced so that the beacon no longer saturates the sensor of the camera 157. In practice this leaves much of the frame blank (or dark) to the naked eye, even though the pixels are not actually at zero (e.g., when the frame is converted to grayscale as described herein, the value of the pixels are near but still greater than 0).

At block 220, the controller 140 of the terminal 110 manipulates the two or more frames to produce two or more interim images. The manipulation of the two or more frames includes executing one or more of image registration, frame subtraction, thresholding, accumulation, and a morphological operation. The manipulation of the two or more frames is further described with respect to FIG. 3A herein.

Figure 3A:
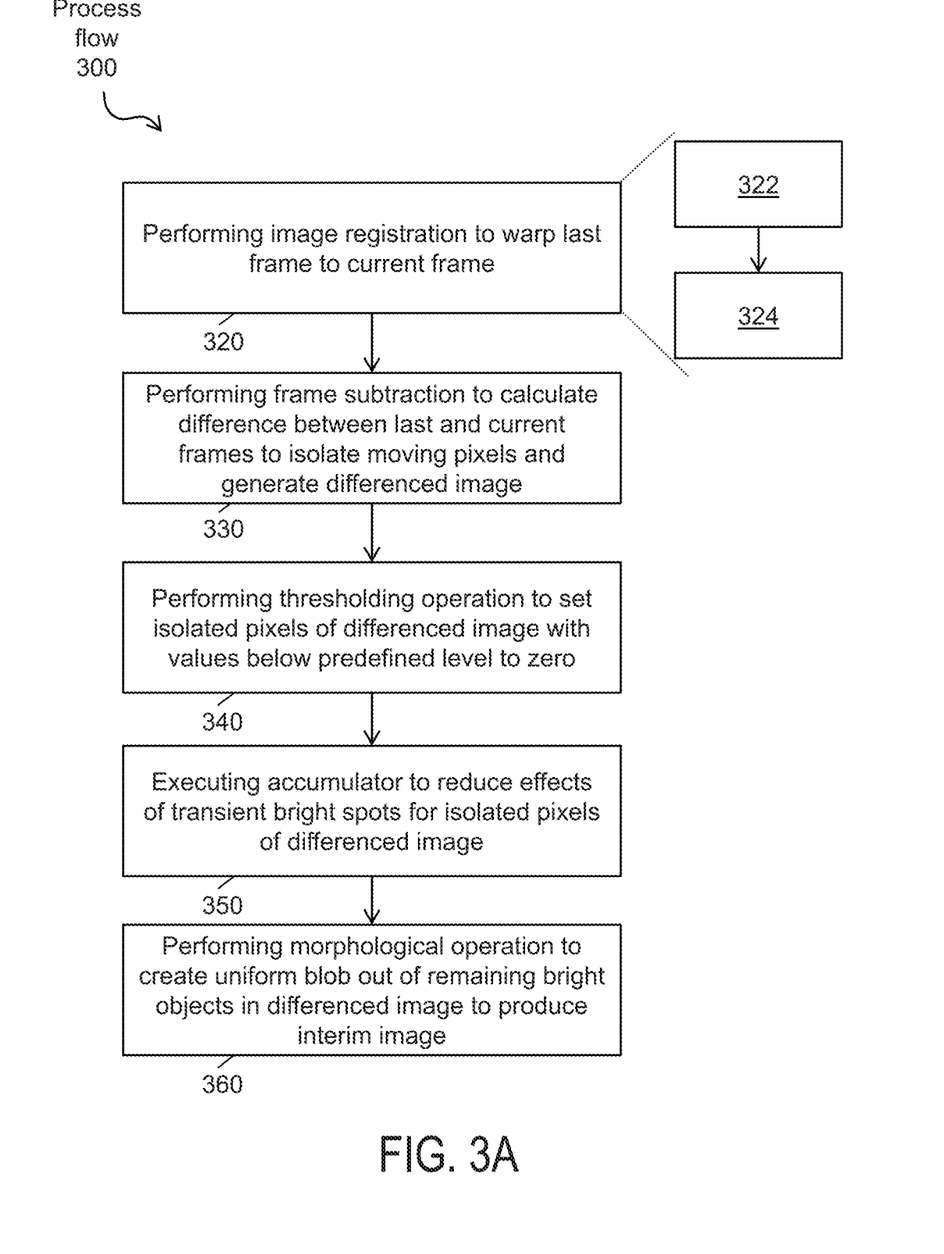
FIG. 3A depicts a process flow according to one or more embodiments.

Turning now to FIG. 3A, a process flow 300 is depicted according to one or more embodiments. The process flow 200 is described with respect to the architecture 139 of FIG. 1. The process flow 300 begins at block 320, where the controller 140 performs image registration. Image registration is further described with respect to sub-blocks 322 and 324. In accordance with one or more embodiments, the two or more frames are processed by the software 144 of the controller 140. Processing the two or more frames includes a conversion 322 to grayscale such that each pixel in each frame is given a value, while maintaining as much resolution as possible. Note that, in accordance with one or more embodiments, each pixel of each frame can be given a value from 0 to 4095 based on the grayscale, where the brighter pixels receive the higher numbers.

Next, processing the two or more frames includes comparing 324 a current frame to previous frames. In general, this comparing is an overlay of two consecutive frames so that, even if the terminals move, the beacon appears to stay in the same place. That is, the current frame is warped to the previous frame, such as by warping a last frame (a first of two frames) to a current frame (a second of two frames), such that all features of the current frame are then "registered" to the features of the last frame (e.g., pixels between frames are matched so that frame subtraction can be performed more accurately). For example, returning to FIG. 2B, the second frame 290 can be warped to the first frame 280, such that the structure 296 in the second frame 290 moves to a same location as the structure 286 in the first frame 280.

In cases where the frames do not have sufficient detail (e.g., in low on picture ratio modes), frame registration may move the last frame away from the current frame. This can negatively affect frame subtraction. Thus, image registration can be optional based on the details of the frames.

Returning now to FIG. 3, at block 330, the controller 140 performs frame subtraction to calculate a difference between the last and current frames to isolate moving pixels and generate/produce a differenced image based on the calculated difference. Frame subtraction, in general, removes the background and leaves the things that move between the two frames. By modulating the beacon, the beacon is brought out of the noise in the single frame.

Figure 3B:
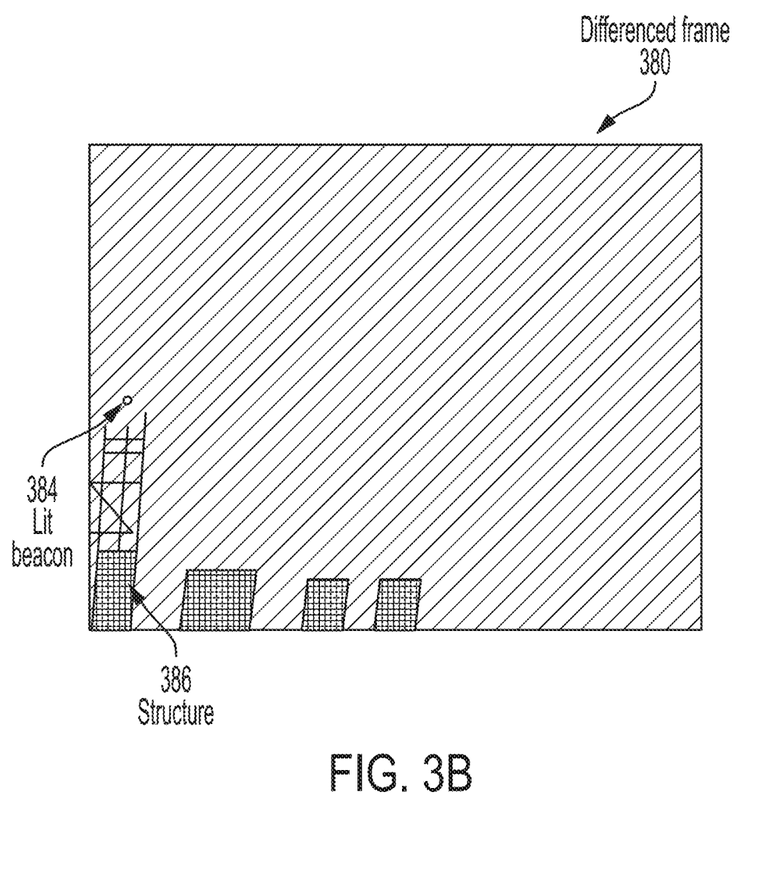
FIG. 3B depicts a differenced frame according to one or more embodiments.

More particularly, the difference between the two frames in then calculated on a per pixel basis. Note that since the beacon is modulated between the last frame and the current frame, the beacon should be "on" in one frame and "off" in the subsequent frame. The pixels associated with the beacon should, in turn, exhibit a very large difference (e.g., as a pixel on a first frame will be bright and a pixel on a second from will be dark). Further, all static pixels in the image may have a zero or near zero difference between the two frames (e.g., because the pixels between the frames will have the same brightness). As a result, the single frame has a set of pixels with low values designating static pixels and a set of pixels with high values designative moving pixels (including the beacon). The set of pixels with high values can be considered isolated pixels of the differenced image. FIG. 3B depicts an example of a differenced frame 380 with the lit beacon 384 isolated. The differenced frame 380 was generated from the first and second frames 280 and 290 of FIG. 2B. Note that the structure 386 (see also structures 286 and 296 of FIG. 2B) is still present in the differenced frame 380; however, it is hard to see with the naked eye (e.g., what looks mostly black in the frame subtraction image, is not because all static pixels in the differenced frame 380 have a zero or near zero value that is not discernable by the naked eye).

At block 340, the controller 140 performs a thresholding operation (e.g., the differenced frame 380 is then passed through a thresholding algorithm/process stored as software 144 in the system memory 143). Thresholding sets the isolated pixels of the differenced image with values below a predefined level to zero, while all pixels with a value above that predefined level maintain their value. The data 145 of the system memory 143 can specify the predefined level. The predefined value can be any number selected from 0 to 4095, such as 10, 15, 25, 30, etc. By leaving all of the pixels with the value above the predefined level, only the brightest portion of the differenced image is maintained.

At block 350, the controller 140 executes an accumulation by an accumulator. The accumulator can be software 144 stored in the system memory 143. The accumulator operates to reduce effects of transient bright spots for the isolated pixels of the differenced image. For example, the accumulator can operate like a moving average, where a forgetfulness is configurable. If the accumulator has a long duration, the accumulator rejects transitory bright spots (e.g., glints and birds) and responds slowly to beacon movement. Thus, if the link partner's beacon is relatively stable in the frame and other objects like glints off of water or other objects are transient, the accumulator causes already bright spots in the frame to become brighter and reduces the effect of transient bright spots. If the accumulator has a short duration, the accumulator tracks both the transitory bright spots and the beacon movement.

Figure 3C:
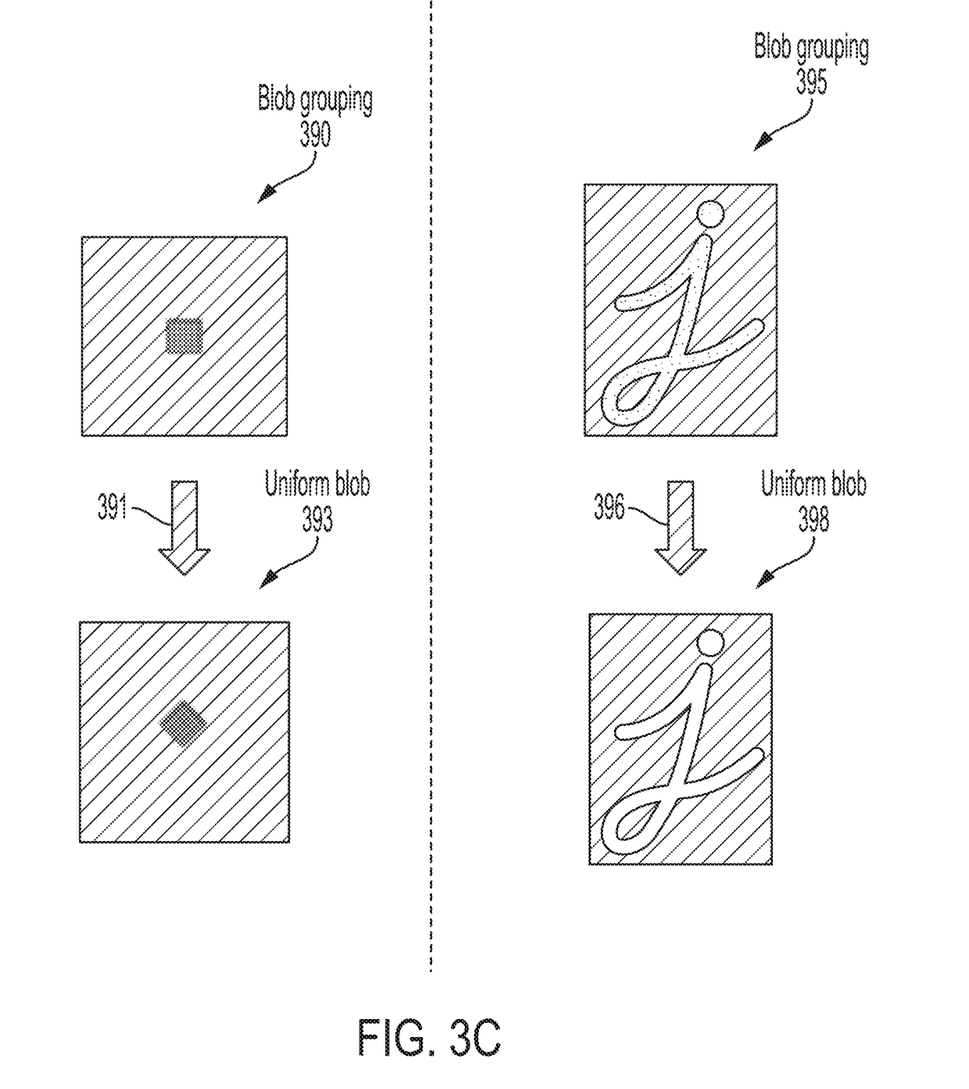
FIG. 3C depicts blob groupings being morphed into respective uniform blobs according to one or more embodiments.

At block 360, the controller 140 performs a morphological operation. The morphological operation creates a uniform blob out of the remaining bright objects in the differenced image to produce an interim image. FIG. 3C depicts a blob grouping 390 being morphed 391 into a uniform blob 393 and depicts a blob grouping 395 being morphed 396 into a uniform blob 398. The morphological operation can include a dilate and erode function, which is stored as software 144 in the system memory 143. The dilate and erode function causes adjacent bright spots to blend together and subsequently have sharper edges (e.g., note that the uniform blob 393 is more of a blended circle than the blob grouping 390; note that the uniform blob 398 is more solid than the blob grouping 395). In accordance with one or more embodiments, the beacon is circular. Since the beacon is circular, morphological operation causes the circle to become more uniform and thus more identifiable.

Optionally, a median blur can be applied to the differenced image. The median blur can cause small bright spots to disappear while larger ones are preserved. Note that median blur can be useful when a large beacon coexists with many small bright spots.

Returning to FIG. 2A, the process flow 200 continues to block 230 once the two or more images have been manipulated. At block 230, the controller 140 of the terminal 110 analyzes the two or more interim images to track the beacon of the terminal 112. The analysis of the two or more interim images includes detecting the beacon within the frames and is further described with respect to FIG. 4 herein.

Figure 4:
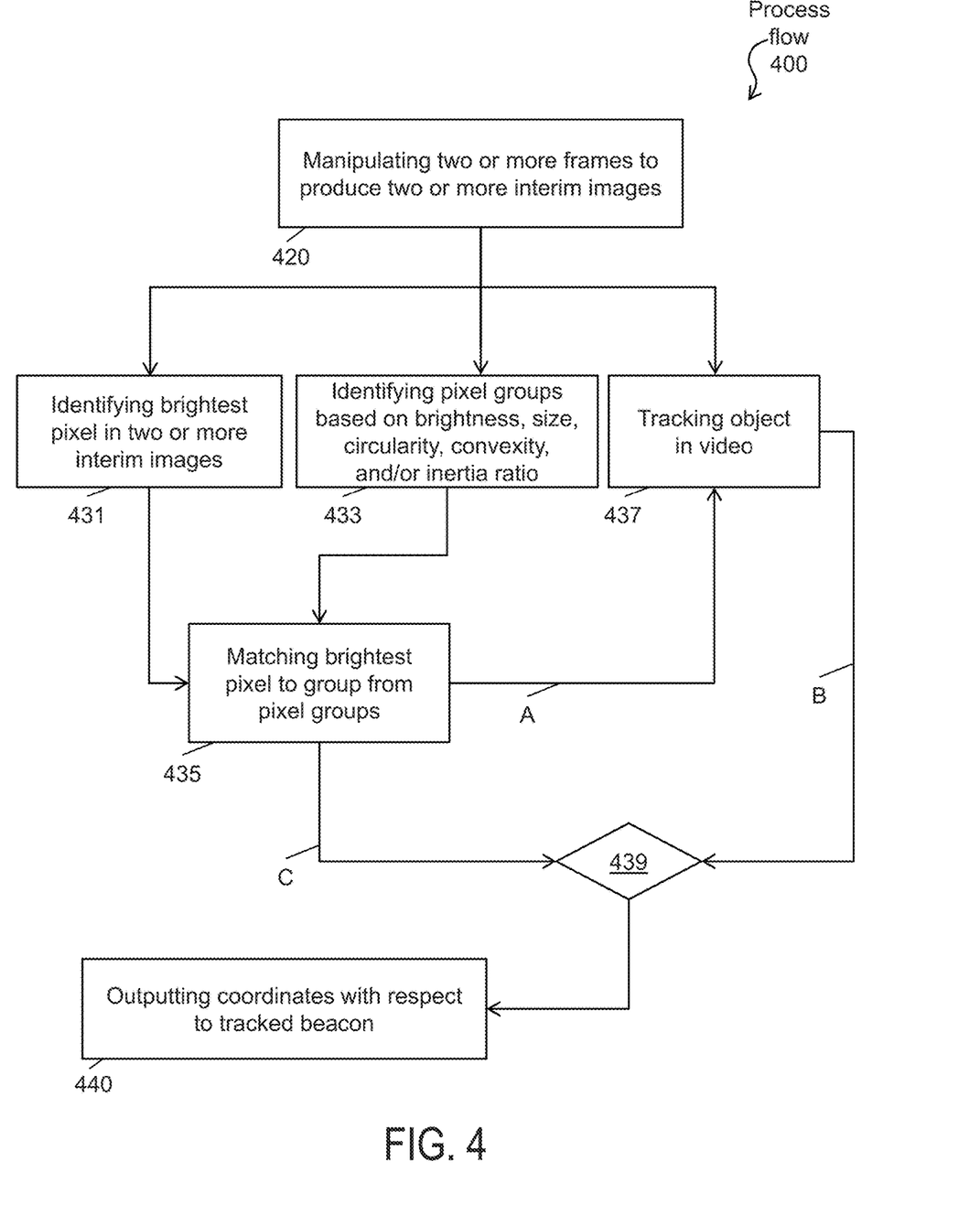
FIG. 4 depicts a process flow according to one or more embodiments.

Turning now to FIG. 4, a process flow 400 is depicted according to one or more embodiments. The process flow 400 is described with respect to the architecture 139 of FIG. 1. The process flow 400 begins at block 420, where the controller 140 manipulates the two or more frames to produce two or more interim images. The operations of block 420 can be similar to the operations of block 220 of FIG. 2A. Further, each of the two or more interim images can be the result of two or more iterations of the process flow 300 of FIG. 3A.

At block 431, the controller 140 identifies a brightest pixel in the two or more interim images. That is, the pixel of each interim image with the highest value is identified as the brightest pixel.

At block 433, the controller 140 identifies one or more pixel groups in the two or more interim images. The controller 140 can utilize/apply a blob detector algorithm/process (e.g., stored as software 144 in the system memory 143) to identify the one or more pixel groups based on characteristics, such as brightness, size, circularity, convexity, and/or inertia ratio (e.g., detect connected bright shapes in an image). Circularity, convexity, and inertia can be measured as values between 0 and 1. The blob detector algorithm/process can also provide a considerable amount of information about those shapes. For instance, it is possible to specify that the blob to track has a certain brightness, color, size, circularity, convexity, and inertia.

Circularity is a degree to which a blob is a perfect circle. If the beacon is set to be circular, then the data 145 of the system memory 143 can specify this setting. If the blob must be a perfect circle then the value is set to a 1. In practice, the beacon never appears as a perfect circle due to atmospheric scintillation. In contrast to the beacon, a bird in the frame is not circular. Thus, utilizing the circularity parameter causes the blob detector algorithm/process to ignore the bird and continue tracking the link partner's beacon.

Figure 5:
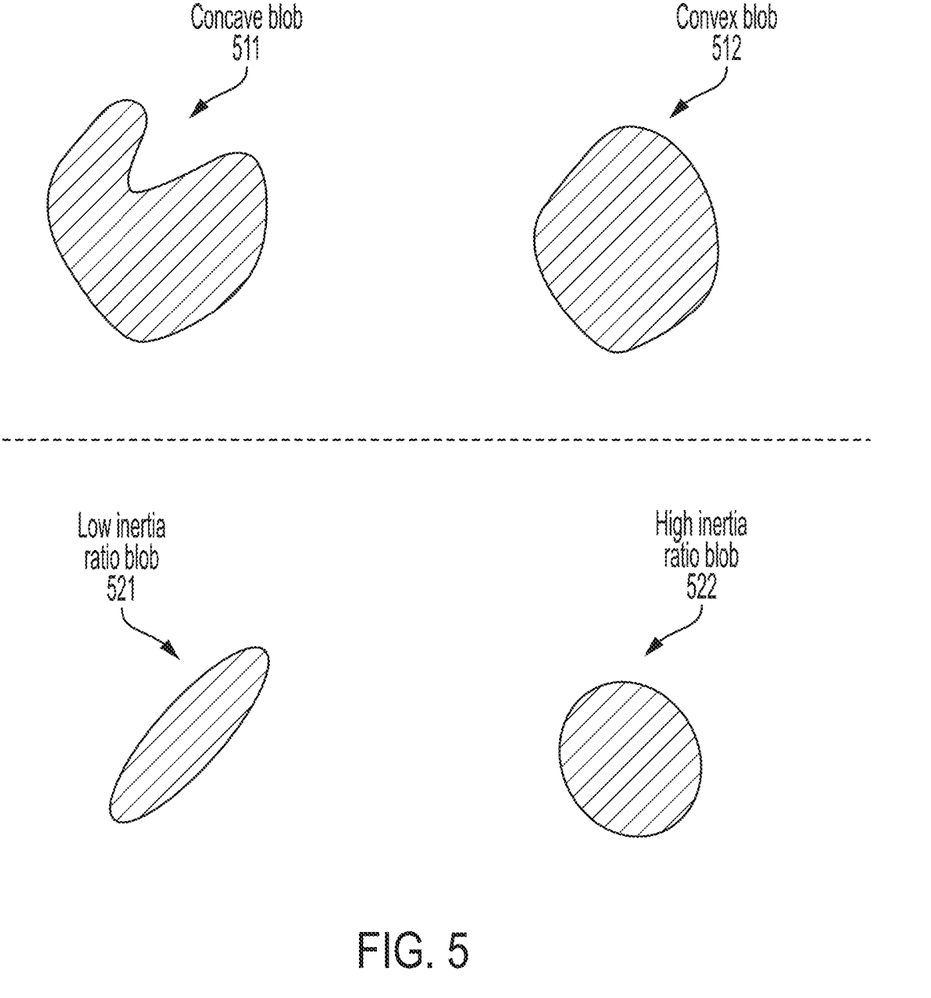
FIG. 5 depicts concave, convex, and inertia ratio blobs according to one or more embodiments.

Convexity is a degree of curvature for a blob. If the beacon is set to be highly convex, then the data 145 of the system memory 143 can specify this setting. In turn, any bright spots in the frame that are concave are ignored. Turning to FIG. 5, convexity is shown by the relative contrast between a concave blob 511 and a convex blob 512.

Inertia can be defined by an inertia ratio. The inertia ratio of a blob is the ratio of one of the blob's axis to the other axis. A perfect circle would have an inertia ratio of one. As the shape of the blob becomes more ovular the inertia ratio approaches zero. For example, in FIG. 5, the inertia ratio is shown by the relative contrast between a low inertia ratio blob 521 and a high inertia ratio blob 522.

In accordance with one or more embodiments, the blob detector algorithm/process creates a list of blobs that fit the criteria specified by the data 145 of the system memory 143. When the system 100 is configured correctly, the signal to noise ratio of the beacon is very high and the blob is tightly specified.

At block 435, the controller 140 matches the brightest pixel (e.g., identified in block 431) to a group from the pixel groups (e.g., identified in block 431) to provide an identified beacon. For instance, when the brightest pixel matches a group (e.g., a blob) with the highest degree of circularity, convexity, and inertia, the blob detector algorithm/process has correctly identified the link partner's beacon and creates a "bounding box" around it (which generates the identified beacon). The identified beacon is then handed off to a video tracker of the software 144 of the system memory 143. In this regard, the process flow 400 follows arrow A to block 437.

At block 437, the controller 140 executes the video tracker to track an object (e.g., the identified beacon) in a video. The video tracker can be a median flow tracker algorithm/process. The median flow tracker algorithm takes history, size, and shape of the object into account. The median flow tracker algorithm/process can also indicate if the output track is valid as it is possible for the beacon to go out of frame. If the beacon goes out of frame, the median flow tracker reports to the controller 140 to return the camera 157 to a coarse pointing solution for link partner reacquisition. In this regard, where the blob detector algorithm/process only considers the current frame fed to it, the median flow tracker algorithm/process understands, for instance, that the beacon cannot jump across the frame in a single frame. In this way, the median flow tracker algorithm/process provides a more realistic tracking of physical objects in the frame.

Thus, after proceeding to decision block 439 along arrow B, the controller 140 determines if the median flow tracker algorithm/process cannot find or loses track of the object. If the median flow tracker algorithm/process cannot find or loses track of the object, the controller 140 utilizes the blob detector algorithm/process to find another candidate beacon (e.g., the process flow 400 follows arrow C). In this regard, while the median flow tracker algorithm/process is running, frames continue to be fed to the blob detector algorithm/process so that if and as soon as the median flow tracker algorithm/process loses track of the beacon, the blob detector algorithm/process can provide a new candidate to track and reacquire the beacon as soon as possible.

At block 440, the controller outputs coordinates with respect to the tracked beacon. For instance, the output of both the median flow and the blob detector algorithms/processes are used by the controller 140 and/or fed to the mirror package 151 to continuously align the FSO data link. Returning to FIG. 2A, the process flow 200 continues to block 240 once the two or more interim images have been analyzed. At block 240 (similar to block 440), the controller 140 of the terminal 110 outputs coordinates with respect to the tracked beacon. These coordinates are utilized to acquire the FOS data link along the LOS 130. As the capturing of the two or more frames of block 210 progress, the frame capture can be a fine or narrow action so that the beacon of the terminal 112 is flashing within a same and central spot of each image capture.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The Figures illustrate the architecture, functionality, and operation of possible implementations of systems, methods, and computer program products according to various embodiments. In this regard, each block in the Figures may represent one or more components, units, modules, segments, or portions of instructions, which comprise one or more executable instructions for implementing the specified logical function(s). The functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the Figures, and combinations of blocks in the Figures, can be implemented by special purpose hardware-based systems that perform the specified functions or acts or carry out combinations of special purpose hardware and computer instructions.

The descriptions of the various embodiments herein have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application, or technical improvement over technologies found in the marketplace, or to enable others of ordinary skill in the art to understand the embodiments disclosed herein.

What is claimed is:

1. A method comprising:
   performing, by a camera of a first terminal, two or more captures of two or more frames across a line of sight toward a second terminal;
   manipulating, by a controller of the first terminal, the two or more frames to produce two or more interim images;

analyzing, by the controller, the two or more interim images to track a beacon of the second terminal; and outputting, by the controller to a mirror package of the first terminal, coordinates with respect to the tracked beacon, wherein the two or more captures are synchronous with a flashing, by a beacon device of the second terminal, of the beacon, such that the beacon is on for a last frame of the two or more frames and off for a current frame of the two or more frames.

2. The method of claim 1, wherein the manipulation of the two or more frames comprises executing an image registration to process a last frame of the two or more frames to a current frame of the two or more frames.

3. The method of claim 1, wherein the manipulating of the two or more frames comprises:

executing a frame subtraction to calculate a difference between pixels of the two or more frames; and generating a differenced image based on the calculated difference.

4. The method of claim 1, wherein the manipulating of the two or more frames comprises executing a thresholding to set pixels with values below a predefined level to zero, the pixels being defined by a differenced image generated from the two or more frames.

5. The method of claim 1, wherein the manipulating of the two or more frames comprises executing an accumulation to reduce effects of transient bright spots for isolated pixels of a differenced image generated from the two or more frames.

6. The method of claim 1, wherein the manipulating of the two or more frames comprises a morphological operation to create a uniform blob out of remaining bright objects in a differenced image generated from the two or more frames to produce at least one of the two or more interim images.

7. The method of claim 1, wherein the analyzing the two or more interim images comprises identifying a brightest pixel in each of the two or more interim images.

8. The method of claim 1, wherein the analyzing of the two or more interim images comprises identifying pixel groups based on characteristics in each of the two or more interim images.

9. A computer program product comprising a computer readable storage medium having program instructions embodied therewith, the program instructions executable by a controller of a first terminal to cause:

performing, by a camera of the first terminal, two or more captures of two or more frames across a line of sight toward a second terminal;

manipulating, by a controller of the first terminal, the two or more frames to produce two or more interim images;

analyzing, by the controller, the two or more interim images to track a beacon of the second terminal; and outputting, by the controller to a mirror package of the first terminal, coordinates with respect to the tracked beacon, wherein the two or more captures are synchronous with a flashing, by a beacon device of the second terminal, of the beacon, such that the beacon is on for a last frame of the two or more frames and off for a current frame of the two or more frames.

10. The computer program product of claim 9, wherein the manipulating of the two or more frames comprises executing an image registration to process a last frame of the two or more frames to a current frame of the two or more frames.

11. The computer program product of claim 9, wherein the manipulating the two or more frames comprises executing a frame subtraction to calculate a difference between pixels of the two or more frames and generate a differenced image based on the calculated difference.

12. The computer program product of claim 9, wherein the manipulating of the two or more frames comprises executing a thresholding to set pixels with values below a predefined level to zero, the pixels being defined by a differenced image generated from the two or more frames.

13. The computer program product of claim 9, wherein the manipulating of the two or more frames comprises executing an accumulation to reduce effects of transient bright spots for isolated pixels of the differenced image generated from the two or more frames.

14. The computer program product of claim 9, wherein the manipulation of the two or more frames comprises a morphological operation to create a uniform blob out of remaining bright objects in a differenced image generated from the two or more frames to produce at least one of the two or more interim images.

15. The computer program product of claim 9, wherein the analyzing of the two or more interim images comprises identifying a brightest pixel in each of the two or more interim images.

16. The computer program product of claim 9, wherein the analyzing of the two or more interim images comprises identifying pixel groups based on characteristics in each of the two or more interim images.

17. A system comprising:

a first terminal comprising a camera, a controller, a mirror package, and a memory storing program instructions thereon, the program instructions executable to cause:

performing, by the camera, two or more captures of two or more frames across a line of sight toward a second terminal;

manipulating, by the controller, the two or more frames to produce two or more interim images;

analyzing, by the controller, the two or more interim images to track a beacon of the second terminal; and outputting, by the controller to the mirror package, coordinates with respect to the tracked beacon, wherein the two or more captures are synchronous with a flashing, by a beacon device of the second terminal, of the beacon, such that the beacon is on for a last frame of the two or more frames and off for a current frame of the two or more frames.

* * * * *